Figure 1:
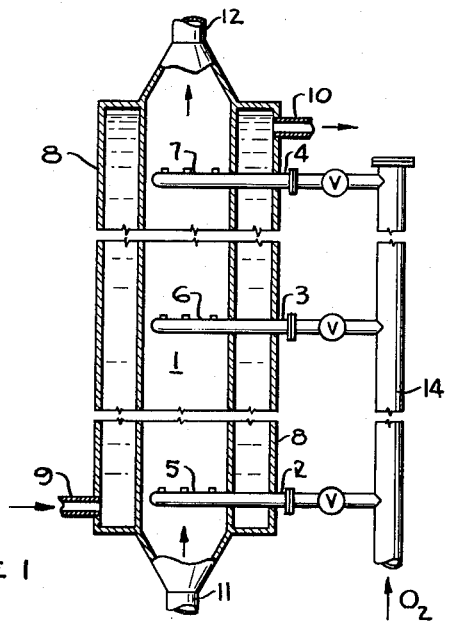

INVENTORS:
JOHN W. MECORNEY
GEORGE W. GAERTNER
ALDO SPENCER LEHMANN
BY: Alan C. Batchelder
THEIR AGENT

United States Patent Office 3,003,853
Patented Oct. 10, 1961

3,003,853
PRODUCTION OF HYDROGEN PEROXIDE
John W. Mecorney, Lafayette, and George W. Gaertner, Modesto, Calif., and Aldo Spencer Lehmann, Riverside, Conn., assignors to Shell Oil Company, a corporation of Delaware
Continuation of application Ser. No. 400,074, Dec. 23, 1953. This application Sept. 24, 1959, Ser. No. 842,164
13 Claims. (Cl. 23—207)

This invention pertains to a process for the production of hydrogen peroxide. More particularly, the present invention pertains to a process for the production of hydrogen peroxide by partial oxidation in the vapor state of alcohols having both the hydroxyl group and a hydrogen atom directly attached to one and the same carbon atom.

It has been proposed heretofore to produce hydrogen peroxide by partial oxidation of primary and of secondary alcohols in the vapor phase. The reaction which is productive of hydrogen peroxide can be caused to occur in this proposed process by causing the primary or secondary alcohol to react with molecular oxygen in the vapor phase under special and carefully controlled conditions. The reaction occurs at temperatures within the range of from about 350° C. to about 500° C., which depend upon the particular alcohol and reaction time, as well as upon the composition of the feed supplied to the reaction zone. The product which is formed by the partial oxidation comprises hydrogen peroxide, unconsumed alcohols, and carbonylic compound (aldehyde or ketone) which is formed as a by-product of the oxidation.

The method which has been thus proposed for the production of hydrogen peroxide has been found to be not entirely satisfactory for the practical production of hydrogen peroxide. It is obvious that, to be commercially useful, any process for the production of hydrogen peroxide must be competitive with such well-established processes as the conventional electrolytic process and also the more or less recently developed 2-alkylanthraquinone process. Although it is true that the heretofore proposed process for producing hydrogen peroxide by vapor phase partial oxidation of secondary alcohols is capable of giving high yields of hydrogen peroxide, based upon the amounts of the alcohol and oxygen which are consumed, the proposed method has been found to suffer from two serious drawbacks. One is that the rate of production of hydrogen peroxide per unit volume of the reaction space is undesirably low. Therefore, for a reactor of any given size, the number of pounds of hydrogen peroxide that can be produced, for example per day, is limited to an undesirably low amount. With isopropyl alcohol, for example, the rates of production of hydrogen peroxide have been found to be limited to values in the order of only 5 to 10 pounds per day per cubic foot of reactor volume. This means that, for the production of hydrogen peroxide in quantities which would be of commercial interest, there is required inordinately large equipment, which adds greatly to the difficulty and cost of preparing hydrogen peroxide by this method. A second difficulty, which is perhaps of even greater significance, is that the crude reaction product contains the hydrogen peroxide only in an undesirably low concentration. For example, an exhaustive study of the production of hydrogen peroxide by partial oxidation of isopropyl alcohol according to this known process now has shown that the concentrations of hydrogen peroxide in the condensed reactor effluent are limited to concentrations below about 2.5 to 3.0% by weight. As a result, the heretofore proposed process has required an undue amount of equipment for effecting the recovery of the relatively small concentrations of hydrogen peroxide which are contained in the crude reaction products. Furthermore, where, as would be likely, the unconsumed alcohol is to be recovered and recycled, there is required an undesirably large amount of recycle for every pound of hydrogen peroxide that is produced.

The present invention provides a new and improved process for the production of hydrogen peroxide by partial oxidation of primary and of secondary alcohols in the vapor phase. The process of the present invention provides for the production of hydrogen peroxide by the vapor phase partial oxidation of primary and secondary alcohols at rates, per unit volume of the reactor, which are increased by as much as 50-fold over the rates of production to which the above-acknowledged known process appears to be limited. By means of the present process there are produced high concentrations of hydrogen peroxide in the reactor effluent, materially above those obtainable by the known process. Recovery of hydrogen peroxide from the crude product is greatly facilitated by virtue of the increased concentrations of hydrogen peroxide therein. By reason of the advantages and improvements which are realized in accordance with the process of the present invention, there is achieved a practical process for the production of hydrogen peroxide by vapor phase partial oxidation of primary and secondary alcohols, which process is adaptable to large-scale operations in the field to which it pertains.

In accordance with the process of the present invention, the oxidation of the primary or secondary alcohol is carried out in the vapor phase and at temperatures within the range of from about 350° C. to about 500° C. The alcohol is vaporized and the vapors, together with steam or other inert diluent if desired, are passed through a succession of oxidation stages or reaction zones under an essential superatmospheric pressure. In each oxidation stage molecular oxygen, or a gas containing molecular oxygen, such as air or oxygen-enriched air, is introduced into and mixed with the vaporous mixture comprising the primary or secondary alcohol, by feeding a continuous stream of the molecular oxygen or gas containing the same into the stream of vaporous mixture passing into and through the stage. After or concurrently with each of these incremental additions of molecular oxygen to the oxidation mixture, the oxidation reaction is caused to occur in each stage under the essential superatmospheric pressure by appropriate control of the flow rates and by maintaining the temperature of the mixture at reaction temperature. After the last oxidation stage the mixture which is formed by the successive partial oxidation of the alcohol is withdrawn as effluent from the last oxidation stage and the hydrogen peroxide is recovered from the withdrawn effluent.

For obtaining the advantages which are provided by the present invention, it is essential to conduct the oxidation with the reacting vapors under superatmospheric pressure. Pressures not less than about 45 pounds per square inch (absolute) are employed. The pressure may range upwardly from 45 pounds per square inch (absolute) to about 1000 pounds per square inch (absolute), although a preferred range is from about 60 pounds per square inch (absolute) to about 500 pounds per square inch (absolute). The pressure is applied, of course, by means which will be obvious, such as by forcing the respective feed streams into the reaction zones by mechanical pumps and withdrawing the effluent from the terminal reaction stage through a pressure let-down device.

The staged oxidation of the primary or secondary alcohol is carried out with the alcohol which is undergoing oxidation present at all times in excess, compared on a molar basis to the molecular oxygen which is present in the reaction mixture. For obtaining the high rates of production and high concentrations of hydrogen peroxide, while at the same time maintaining high yields of hydrogen peroxide based upon the reactants consumed, it is necessary that both the relative over-all amounts of alcohol and molecular oxygen fed to the system and the amount of molecular oxygen fed in each increment, or reaction stage, be controlled within limits. The over-all ratio of primary or secondary alcohol to molecular oxygen should be maintained within the range of from about 2:1 to about 20:1 (mole basis) and preferably within the range of from about 5:1 to about 10:1. In other words, for each mole of oxygen supplied to the total system, there should be supplied from about 2 to about 20, preferably from about 5 to about 10, moles of the alcohol. The amount of oxygen supplied to each of the successive stages should be between about 0.25 and 0.01, preferably between about 0.1 and about 0.04, mole per mole of alcohol in the reaction mixture at the point of addition and subject to the above limitation on the over-all mole ratio. In the simplest case we may employ a 2-stage addition of the oxygen. In this case, for example, about one-half of the total amount of oxygen may be preliminarily mixed with the vaporous primary or secondary alcohol and the mixture passed through a first oxidation stage. The remaining quantity of oxygen then may be introduced into and mixed with the mixture formed in the first oxidation stage and the mixture thus formed passed through the second oxidation stage where the reaction is completed. The effluent from the second oxidation stage is collected and hydrogen peroxide is recovered from the collected effluent. There advantageously are employed more than two stages, however, and the most desirable number of stages is from three to about eight, inclusive. The streams of gas containing molecular oxygen which are introduced into the respective stages ordinarily will contain approximately equal proportions of the total oxygen fed to the reaction system, although this relationship is subject to moderate variation.

It is essential that both alcohol and molecular oxygen be present together throughout the reaction zone during the staged addition of the oxygen and the subsequent reaction stages. In order to insure this, it is desirable to limit the total conversion of the oxygen fed to not over 90%. The amount of the alcohol present in each stage preferably is maintained between about 10 and about 500 moles per mole of oxygen by regulating the percentage conversion of the oxygen. The conversion of the oxygen fed into the reaction zone and the relative proportions of alcohol and oxygen in the reaction mixture may be controlled readily by regulation of the rates of feed to the reaction system and by the spacing of the inlets for the gas containing molecular oxygen. It is preferable, although not essential, that the residence time of the reaction mixture in the successive stages be progressively less from stage to stage in the direction of flow of the alcohol reactant. Total residence times of from about 1 second to about 1 minute are generally suitable.

The oxidation of the primary or secondary alcohol may be carried out in the presence of an inert diluent gas. The diluent conveniently may be steam, although nitrogen, helium, and other inert gases may be employed alone or in mixtures. For example, air may be employed as the gas containing molecular oxygen and, where the alcohol is one that forms an azeotropic mixture with water, the alcohol may be supplied in the form of the aqueous azeotrope. Ordinarily the dilution of the gas stream with inert diluents should be kept below about 50% and preferably to a minimum since the principal consequence of the presence of a diluent gas is an increase in the volume of gas mixtures that must be handled.

Figure 2:
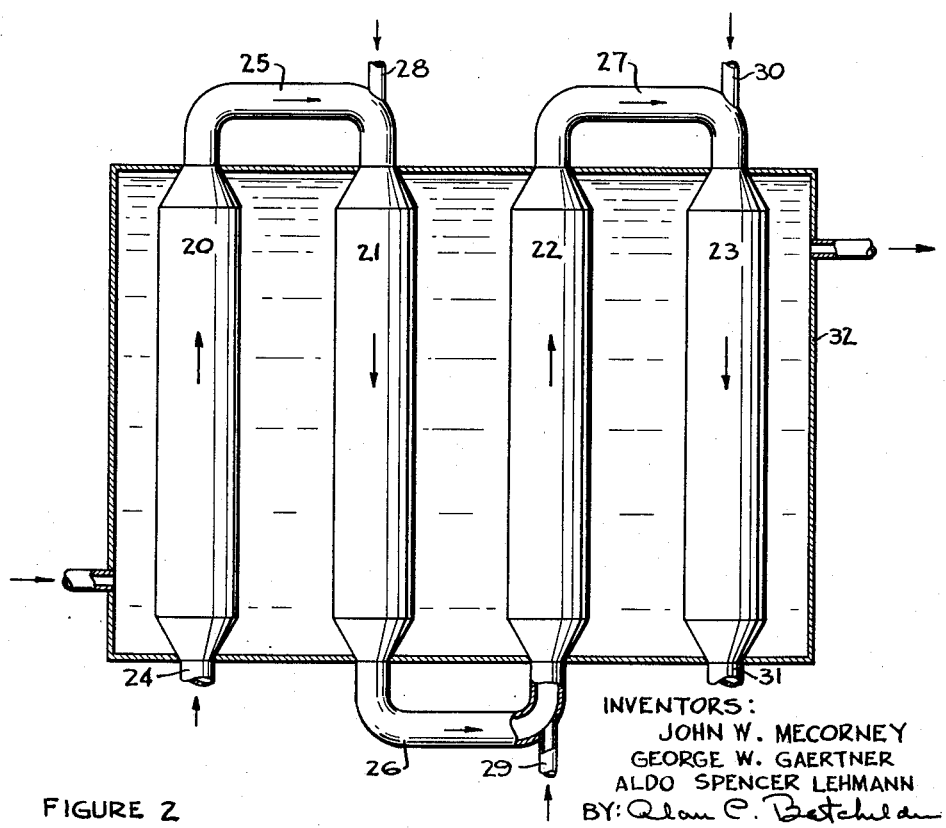

Equipment suitable for carrying out the process of the invention is shown diagrammatically in FIGURES 1 and 2.

In FIGURE 1 there is illustrated a single tubular reactor 1 with spaced oxygen inlets 2, 3, and 4 provided with manifolds 5, 6, and 7, respectively, or other gas dispersing means. The reaction tube is surrounded by jacket 8, through which a fluid heat exchange medium may be circulated by inlet 9 and outlet 10, or in place of the heat transfer system shown there may be employed a heater, such as electrically heated strips. The primary or secondary alcohol, after volatilization in a suitable vaporizer (not shown) is introduced via inlet 11 while separate streams of oxygen are introduced at inlets 2, 3, and 4 from conduit 14. Oxygen also may be mixed with the alcohol vapors to their introduction into the illustrated reactor by a suitable inlet (not shown) in feed line 11. Product gas is withdrawn via outlet 12 and is conveyed to a condenser and therein cooled or is quenched with water for cooling and condensation to the liquid state and subsequent recovery of the hydrogen peroxide.

In FIGURE 2 there is illustrated equipment embodying plural tubular reactors 20, 21, 22, and 23 arranged in series flow with inlet 24 provided for introduction of the alcohol feed, with connecting lines 25, 26, and 27, with inlets 28, 29 and 30 for introduction of molecular oxygen, air, or other gas containing molecular oxygen, and with effluent line 31. The several tubular reactors may be mounted together in jacket 32 containing a fluid heat transfer medium, or they may be provided with individual and separately controllable heating means, as where it may be desired to maintain the temperatures in the different stages at different levels.

Instead of employing tubular reactors, there may be employed for the different stages reactors tending more or less to the spherical in form, so as to reduce the amount of surface that will be exposed to the vaporous reaction mixture in a reactor of any given volume, and the feed to each stage may be introduced more or less tangentially to the inner walls and the product gas withdrawn via an outline leading from a position more or less centrally located in the reaction space, thereby tending to minimize contact of the reacting mixture with the reactor walls. In any event, the reaction vessels, or at least their inner surfaces, should be constructed of materials which are not incompatible with hydrogen peroxide, such as glass, stainless steel, porcelain, aluminum, tin, or a resin. Feed lines and other conduits should be constructed with care to avoid possible contamination of the reaction vessels with materials which might favor decomposition of the hydrogen peroxide.

The hydrogen peroxide contained in the gaseous effluent from the terminal reaction stage may be recovered by any suitable method. One convenient method is to chill the gaseous effluent and then to distill the condensate, preferably in the presence of sufficient water and at subatmospheric pressures in order to minimize any likelihood of violent reaction between the hydrogen peroxide and the organic materials which necessarily are present. The alcohol which is not consumed may be recovered separately and recycled through the process with make-up feed. The carbonylic by-product (aldehyde or ketone) may be reduced, for example by hydrogenation, to convert it to the alcohol and the alcohol thus regained may be recycled.

Hydrogen peroxide has been produced by the process of the present invention at high rates of production, with high yields, based upon the alcohol and oxygen consumed, and with formation of a crude reaction product from which the hydrogen peroxide is easily recoverable by reason of the high concentration of hydrogen peroxide therein. In one run which is illustrative of those that have been performed according to the invention, isopropyl alcohol was partially oxidized in the vapor phase at about 395° C. using an over-all mole ratio of alcohol to oxygen of about 5:1 and operating at a pressure of about 60 pounds per square inch (absolute). The alcohol was vaporized and passed through a heated elongated reaction tube, the oxygen being introduced at points along the tube in a plurality of stages, the several streams of oxygen being about equal in volume. The oxygen inlets were so spaced that the total residence time of the alcohol in the reactor (ca. 9 seconds), was about equally distributed among the several stages. Hydrogen peroxide was produced at a rate of about 70 pounds per day per cubic foot of the reactor and the condensed effluent contained about 5 to 6% by weight of hydrogen peroxide. Under these same conditions, except that all of the oxygen is introduced with the alcohol feed, and atmospheric pressure is employed, the rate of production of hydrogen peroxide is only about 5 pounds per cubic foot of reactor volume per day and the concentration of hydrogen peroxide in the condensed reactor effluent is but about 2.5% to 3.0% by weight.

Isopropyl alcohol is particularly suitable as the alcohol reactant. However, the process of the invention can be applied to the production of hydrogen peroxide by vapor-phase oxidation of other alcohols than isopropyl alcohol. Suitable other alcohols include primary alcohols, such as ethanol, propanol, butanol, isobutanol, and ethylene glycol, as well as secondary alcohols, such as s-butyl alcohol, s-amyl alcohol, cyclohexanol, and the like, and their homologs and analogs. Unsaturated alcohols, such as allyl alcohol and propargyl alcohol, likewise can be oxidized according to the process of the invention, although since they obviously are somewhat more valuable for other purposes than, for example, the saturated lower aliphatic primary and secondary alcohols, the latter generally are the ones that will be employed.

This application is a continuation of Serial No. 400,074, filed Dec. 23, 1953, now abandoned.

We claim as our invention:

1. A process for the preparation of hydrogen peroxide which comprises passing a vaporous mixture comprising molecular oxygen and an alcohol of at least two carbon atoms per molecule and having both the hydroxyl group and a hydrogen atom attached to one and the same carbon atom in the vapor phase through a succession of reaction zones while maintaining the reaction mixture at a temperature within the range of from about 350° C. to about 500° C. under a pressure within the range of from about 45 pounds per square inch (absolute) to about 1000 pounds per square inch (absolute), between each pair of said successive reaction zones adding a stream of gas containing molecular oxygen to the vaporous mixture in an amount corresponding to from about 0.25 to about 0.01 mole of added molecular oxygen per mole of alcohol at the point of addition and in amounts further corresponding to a mole ratio of total alcohol supplied to total oxygen added between about 2:1 and about 20:1, withdrawing effluent from the terminal reaction zone at a rate such that not over 90% of the total oxygen fed is consumed, and recovering hydrogen peroxide from the withdrawn effluent.

2. A process defined by claim 1 in which the alcohol is a secondary alcohol.

3. A process defined by claim 2 in which the secondary alcohol is isopropyl alcohol.

4. A process defined by claim 1 in which the alcohol is a primary alcohol.

5. A process defined by claim 4 in which the primary alcohol is ethanol.

6. A process for the preparation of hydrogen peroxide which comprises oxidizing an alcohol of at least two carbon atoms per molecule and having both the hydroxyl group and a hydrogen atom directly attached to one and the same carbon atom by reaction in the vapor phase with molecular oxygen in a plurality of successive reaction zones maintained at temperatures within the range of from about 350° C. to about 500° C. under pressures within the range of from about 45 pounds per square inch (absolute) to about 1000 pounds per square inch (absolute), incrementally adding molecular oxygen to the reaction mixture while the vaporous reaction mixture is passed through the successive reaction zones in such amounts and at such rates as to maintain in the reaction mixture at all times between about 10 and about 500 moles of alcohol per mole of oxygen and to provide a mole ratio of total alcohol fed to total oxygen fed between about 10:1 and about 5:1, and recovering hydrogen peroxide from the oxidation product of the last of said successive stages.

7. A process for the preparation of hydrogen peroxide which comprises passing a vaporous mixture comprising an alcohol of at least two carbon atoms per molecule and having both the hydroxyl group and a hydrogen atom attached to one and the same carbon atom in the vapor phase and molecular oxygen through a succession of reaction zones each maintained at a temperature within the range of from about 350° C. to about 500° C. and a pressure of from about 45 to about 1000 pounds per square inch (absolute), after passage of the vaporous mixture through the first of said successive reaction zones but prior to its passage through the last of said successive reaction zones adding a stream of gas containing molecular oxygen to the vaporous mixture, the total amounts of molecular oxygen and said alcohol corresponding to an alcohol:oxygen mole ratio within the range of from about 5:1 to 20:1, withdrawing effluent from the terminal reaction zone at a rate such that not over 90% of the oxygen fed is consumed, and recovering hydrogen peroxide from the withdrawn effluent.

8. A process defined by claim 7 in which the alcohol is a secondary alcohol.

9. A process defined by claim 8 in which the secondary alcohol is isopropyl alcohol.

10. A process defined by claim 7 in which the alcohol is a primary alcohol.

11. A process defined by claim 10 in which the primary alcohol is ethanol.

12. A process for the production of hydrogen peroxide by partial oxidation in vapor phase of an alcohol of at least two carbon atoms per molecule and having both the hydroxyl group and a hydrogen atom directly bonded to one and the same carbon atom which comprises passing a vaporous stream comprising said alcohol in the vaporous state through an elongated reactor providing a plurality of successive reaction zones therein maintained at a temperature within the range of from about 350° C. to about 500° C., and a pressure of from about 45 pounds per square inch (absolute) to about 1000 pounds per square inch (absolute), introducing molecular oxygen into said reaction zone at a plurality of points along the length thereof, controlling the rate of molecular oxygen introduction to incrementally add molecular oxygen to the vaporous stream during its passage through said reaction zones in such amounts and at such a rate that there is maintained at all times during passage of the vaporous stream through the reaction zones an excess of the alcohol compared on a molar basis to the added oxygen and that there is a mole ratio of alcohol fed to total molecular oxygen added between about 2:1 and about 20:1 and withdrawing gaseous effluent from said reaction.

13. A process for the preparation of hydrogen peroxide which comprises passing a vaporous mixture comprising an alcohol of at least two carbon atoms per molecule and having both the hydroxyl group and a hydrogen atom attached to one and the same carbon atom in the vapor state and molecular oxygen through a succession of reaction zones while maintaining the reaction mixture at a temperature within the range of from about 350° C. to about 500° C. and under a pressure of at least about 45 pounds per square inch (absolute), after passage of the vaporous mixture through the first of said successive reaction zones adding a stream of gas containing molecular oxygen to the vaporous mixture and thereafter passing the mixture through a succeeding reaction zone of said succession, the mole ratio of alcohol fed to total molecular oxygen added being between about 2:1 and about 20:1, and there being maintained at all times a molecular excess of the alcohol compared to the molecular oxygen in the vaporous reaction mixture.

References Cited in the file of this patent

UNITED STATES PATENTS

| | | |
|---|---|---|
| 2,462,413 | Meath | Feb. 22, 1949 |
| 2,479,111 | Harris | Aug. 16, 1949 |